(12) United States Patent
Hassan et al.

(10) Patent No.: US 11,180,643 B2
(45) Date of Patent: Nov. 23, 2021

(54) PROTECTIVE GARMENTS

(71) Applicant: Ansell Limited, Richmond (AU)

(72) Inventors: Noorman Abu Hassan, Shah Alam (MY); Ahmad Helmi Ujar, Shah Alam (MY); Zam Rizal Mustaffa, Kuala Langat (MY); Fazli Bin Shani, Puchong (MY); Wan Ashruzi Bin Wan Ahmad, Klang (MY)

(73) Assignee: Ansell Limited, Victoria (AU)

( * ) Notice: Subject to any disclaimer, the term of this patent is extended or adjusted under 35 U.S.C. 154(b) by 76 days.

(21) Appl. No.: 16/476,130

(22) PCT Filed: Feb. 7, 2018

(86) PCT No.: PCT/AU2018/000015
§ 371 (c)(1),
(2) Date: Jul. 5, 2019

(87) PCT Pub. No.: WO2018/148780
PCT Pub. Date: Aug. 23, 2018

(65) Prior Publication Data
US 2020/0015529 A1 Jan. 16, 2020

Related U.S. Application Data

(60) Provisional application No. 62/461,038, filed on Feb. 20, 2017.

(51) Int. Cl.
| | | |
|---|---|---|
| *A41D 19/015* | (2006.01) | |
| *C08L 13/02* | (2006.01) | |
| *B29C 41/00* | (2006.01) | |
| *C08F 8/42* | (2006.01) | |
| *C08F 236/12* | (2006.01) | |
| *B29C 41/14* | (2006.01) | |
| *B29K 35/00* | (2006.01) | |
| *B29K 509/08* | (2006.01) | |
| *B29L 31/48* | (2006.01) | |

(52) U.S. Cl.
CPC ............ *C08L 13/02* (2013.01); *B29C 41/003* (2013.01); *C08F 8/42* (2013.01); *C08F 236/12* (2013.01); *A41D 19/01505* (2013.01); *B29C 41/14* (2013.01); *B29K 2035/00* (2013.01); *B29K 2509/08* (2013.01); *B29L 2031/4864* (2013.01)

(58) Field of Classification Search
CPC .......... A41D 19/01505; A41D 19/0006; C08F 236/12; C08F 8/42; B29C 41/003; B29C 41/14
USPC ......................................... 524/565
See application file for complete search history.

(56) References Cited

U.S. PATENT DOCUMENTS

| | | |
|---|---|---|
| 9,475,263 B1 | 10/2016 | Rangan et al. |
| 2006/0150300 A1 | 7/2006 | Hassan et al. |
| 2006/0257674 A1 | 11/2006 | Lipinski et al. |
| 2012/0150177 A1 | 6/2012 | Heim et al. |
| 2015/0143608 A1* | 5/2015 | Loo .................... B29D 99/0067 2/161.6 |
| 2015/0374052 A1 | 12/2015 | Pimentel de Oliveira et al. |

OTHER PUBLICATIONS

International Search Report dated Dec. 6, 2018 for application PCT/AU2018/000015.
Joseph Davidovits, "Properties of Geopolymer Cements", Geopolymer Institute, 01200 Saint-Quentin, France, XP055734797, Jan. 1, 1994.
Supplementary European Search Report for Application No. EP 18753535.6, dated Sep. 29, 2020.

* cited by examiner

*Primary Examiner* — Hui H Chin
(74) *Attorney, Agent, or Firm* — Moser Taboada

(57) ABSTRACT

Provided among other things is an polymeric protective garment comprising a layer of carboxylated polymer that incorporates an alumina-silica composition, thus forming a silica alumina polymer composite.

19 Claims, 3 Drawing Sheets

PROTECTIVE GARMENTS

The present application relates generally to protective polymeric garments including a silica alumina—polymer composite.

Polymeric protective garments, such as gloves, are commonly used for example to protect hands in industrial or household environments. A supported glove is a glove having a fabric liner that is at least partially coated with a coating, such as a polymeric coating. Supported gloves combine durability with relative comfort. Ideally, such protective garments can be flexible, chemical-resistant, and abrasion-resistant. Various polymeric and elastomeric materials have been specified for use in supported and unsupported gloves. Various crosslinking agents, such as elemental sulfur and Zinc Oxide, have been used to crosslink the molecules of the polymeric (such as elastomeric) materials, which imparts enhanced physical properties.

It has now been discovered that very useful properties can be obtained by appropriately incorporating a alumina-silica composition into carboxylated polymer. Without being bound by theory, this is believed to be analogous to free radical carbon-carbon crosslinking, forming inorganic-to-organic crosslinks. Similarly in bulk carboxylated polymer, such as used for injection molding, compression molding, blow molding or the like, such crosslinking is also believed to be obtained. Without being bound by theory, when working with latex it is believed that by utilizing appropriate solvent additives one avoids water-absorbent polymer particles from prematurely absorbing silica alumina particles during compounding, causing premature gelation that would mar formation of the finished product. In embodiments, the finished product (post final vulcanization) has the advantage of having higher chemical resistance. In embodiments, the finished product has the advantage of having higher abrasion resistance.

SUMMARY

Provided among other things is an polymeric protective garment comprising a layer of carboxylated polymer that incorporates an alumina-silica composition, thus forming a silica alumina polymer composite.

Embodiments according to the invention include protective garment such as gloves, and methods for manufacturing the same, substantially as shown in and/or described in connection with at least one of the figures, as set forth more completely in the claims, are disclosed. Various advantages, aspects, and novel features of the present disclosure will be more fully understood from the following description and drawings.

The foregoing summary is not intended, and should not be contemplated, to describe each embodiment or every implementation of the present invention. Other and further embodiments of the present invention are described below.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
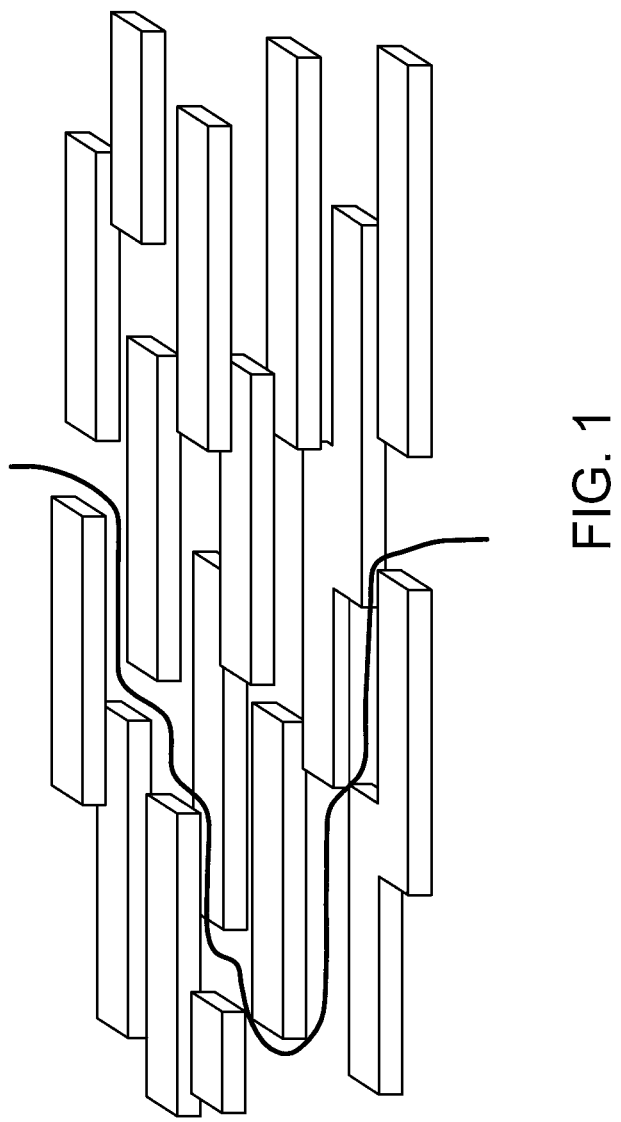
FIG. 1 depicts a proposed mechanism for improving solvent resistance.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

An "polymeric protective garment" is a garment such as a glove, shoulder-length glove, bootie, hoodie (such as configured for use with protective goggles), wading boots or outfit, condom, drysuit, chem-hazard suit or the like made with one or more layers of polymer. The polymer layer(s) can be supported or lined, or unsupported. Where the polymer is elastomeric, there can be advantages in terms of the fit of the garment.

A "carboxylated" polymer is one that has, or is reacted to have, carboxylic acid functional groups in numbers sufficient to provide useful crosslinking sites.

In measurements made by EN374-3 2003 or EN388:16 2016, four or more samples are measured, and the measurement is the average value. All abrasion resistance measurements described herein are made by EN388:16 2016. All solvent resistance measurement described herein are made by EN374-3 2003.

Polymers for use in the invention can have carboxylic acid functionality as a result of the mix of monomers used in there formation, or by being grafted onto the polymer post polymerization. Exemplary polymers include for example a carboxylated latex such as nitrile-butadiene (NBR), styrene-butadiene rubber (SBR), polychloroprene (CR), methyl methacrylate-butadiene rubber (MBR), appropriately engineered acrylic polymers (such as acrylamides, 2-hydroxymethacrylates and the like), appropriately engineered N-vinyl pyrrolidones and/or mixtures thereof. Other exemplary polymers include, without limitation, polychloroprenes, butyl rubbers, natural rubber, synthetic polyisoprenes, poly(vinyl) chlorides, polyesters, polyamides, polyfluorocarbons, polyolefins, polybutadienes, polyurethanes, polystyrenes, poly(vinyl) alcohols, and copolymers of the foregoing, and elastomeric polymers such as elastic polyolefins, copolyether esters, polyamide polyether block copolymers, block copolymers having the general formula A-B-A' or A-B like nitrile-butadiene rubber (NBR), styrene-poly(ethylene-propylene)-styrene, styrene-poly(ethylene-butylene)-styrene, (polystyrene/poly(ethylene-butylene)/polystyrene, poly(styrene/ethylene-butylene/styrene), copoly(styrene/ethylene-butylene), A-B-A-B tetrablock copolymers and the like and/or blends of any of the foregoing. Polymer mixtures including carboxylated nitrile-butadiene are useful.

Among the solvents believed to help stabilize a mixture of latex polymer and alumina-silica composition are polyhydric alcohols. Non limiting examples include: diol group including ethylene glycol, 1,2 propanediol, 1,3 propanediol, butanediols (such as 1,2 butanediol, 1,3 propanediol, 1,4 butanediol, 2,3 butanediol, etc) pentanediols (such as 1,5 pentanediol, 1,3 pentanediol, 2,3 pentanediol, etc), hexanediols (such as 1,6 hexanediol, 2,5 hexanediol etc), 2-methyl 2,4 pentanediol, 2-methyl 2,3 butanediol, etc; triol group including glycerin, trimethylolpropane, hexanetriols (such as 1,2,6 hexanetriol, 1,3,5-hexanetriol etc), triethanolamine, and the like; tetraol group including petaerythrito, diglycerin, and the like; petaol group including glucose, furanose etc; hexanol group including sorbitol, mannitol, and the like; octaol group including sucrose, and the like; lower alkylene oxide addition product of the compounds above and lower alkylene oxide copolymers. These polyhydric alcohols can be used by mixing two or more types of them. The lower alkylene oxides have 2 or 4 carbon atoms such as ethylene oxide (hereinafter referred to as PO), butylene oxide, and the like. Examples of polyhydric alcohols to which these alkylene oxides are added are include for example: diethylene glycol, triethylene glycol, polyethylene glycols [mean molecular weight (hereinafter referred to as MW): 200, 300, 400, 600, 1000, 2000, 4000, etc,], dipropylene glycol, tripropylene glycol, polypropylene glycols [MW: 200, 400, 1000, 2000, 4000, etc], glycerin-EO addition products [MW: 400, 600, 1000, 3000, 4000 etc], glycerin-PO addition products [MW: 400, 600, 1000, 3000, 4000 etc], glycerin-EO (50)/PO (50) random addition products [MW: 2600, etc] glycerin PO (80)-EO (20) block addition products [MW: 3000, etc], trimethylopropane-EO addition product, trimethylolpropane-PO addition product, pentaerythritol-EO addition product, and sorbitol-EO addition product, etc. The lower alkylene oxide copolymers can for example include random copolymers or block copolymers, such as polypropylene glycol-EO addition products [MW: 2400, 3100, 4000, etc].

The alumina-silica composition can usefully be formed with a silica composition of particle size from about 1 to about 100 nm average size. Size is measured with a Dynamic Light Scattering (DLS) Instrument, such as a Horiba SZ-100 Nano Particle Analyzer, which provides general method of determining the size of extremely small particles in the sub-micron range formed in suspension. The silica particles are added as a filler phase in a polymer matrix. In embodiments, the silica particles are about 10 to about 20 nm average size.

One way to prepare the silica alumina polymer composite is to use two separate preliminary mixtures. In the first part, mix of a water-based crosslinker (WBC aka GPC) comprising of aluminium oxide, base (such as sodium hydroxide), appropriate solvent (such as polyhydric alcohol) and water is added into and mixed slowly (such as, with latex, stirred) into a carboxylated polymer. The WBC-polymer mixture is matured, such as under continuous gentle stirring, which is believed to prevent agglomeration and sedimentation. Generally, this WBC-polymer mixture maturation is conducted for about 24 hours or more.

In the second part, WBC is added into and mixed slowly into a water-based dispersion of the silica. The WBC-silica mixture is matured, such as under continuous gentle stirring, which is believed to prevent agglomeration and sedimentation. Generally, this WBC-silica mixture maturation is conducted for about 24 hours or more. Without being bound by theory, it is believed that modification of the silica surface in the dispersion form with sodium aluminates gives a fix negative surface charge that is not pH dependent and gives a surface with a higher charge (at for example pH range 3-9) relative to a non-modified silica. Furthermore, such surface modifications lower the solubility of the silica surface and hence can be used to stabilize colloidal silica dispersions of a high specific surface area.

The second part can then be added slowly into the first part mix. Other standard compounding additives for polymer processing can be added here or earlier. In embodiments, the elastomeric layer can be foamed or a continuous polymer film formed by dipping or other molding process. The air content of foamed elastomeric can be adjusted from 10% to 30%. In continuous film embodiments, thin or thick continuous films can also be formed. Laminates of continuous and foamed films can be formed. One or more of such laminated layers can utilize the silica alumina polymer composite. The type of manufactured article can include for example for single use disposables, thick industrial unsupported industrial gloves and thin supported industrial gloves.

In embodiments, the WBC is added to the silica, then added to the polymer composition.

In mixtures to form the WBC, the stabilizing solvent can be, for example, from about 1% to about 20% by weight, aluminium oxide from about 1% to about 20% or about 30% and mineral base (such as sodium hydroxide) from about 1% to about 20%, with balance of deionized water to make up to 100% by weight. For mineral base, amounts in the range from about 10% to about 20% by weight are favorably used. For aluminum oxide, amounts in the range from about 15% to about 25% by weight are favorably used.

In use with polymer, favorably the stabilizing solvent dilutes to about 0.5% to about 10% by weight of the polymer composition (prior to curing).

The silica alumina composite is believed to form a 3-D network inside the polymer film (e.g., nitrile film) via the oxide network crosslinking the polymer via the carboxylic acid functions. While the invention is not limited to the theory for why good properties of the composite are obtained, it is believed that the silica alumina composite serves not as reinforcement fillers, or not simply as a filer, but also as a crosslinking agent. It is believed that this is what ensures that the mechanical durability of the product post vulcanization. the silica alumina is incorporated into polymer without compromising the flexibility of the film for making industrial dipped or otherwise formed articles such as gloves.

At the same time, a torturous path for solvent given by the 3-D silica alumina structure is proposed in FIG. 1. The embedded silica-alumina makes it more difficult for solvents to permeate through the polymer film and thus enhances chemical permeation performance of for example nitrile films. Polymeric articles can be manufactured thinner, at a lower cost, and providing greater flexibility without compromising of mechanical and chemical performance.

For use in other contexts, Davidovits proposed the following structure for the silica-alumina polymer:

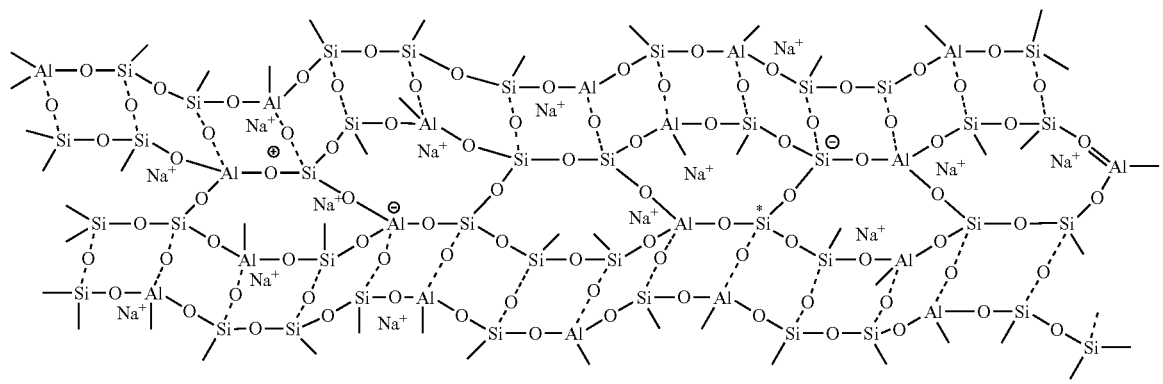

[Davidovits, Synthesis of High-Temperature Geopolymers for Reinforced Plastics/Composites, SPE PACTEC '79 Society of Plastic Engineers, Brookfield Center, USA, p. 151-154, 1979]

In an embodiment with potassium counter-ions, the crosslinks between silica polymers can be:

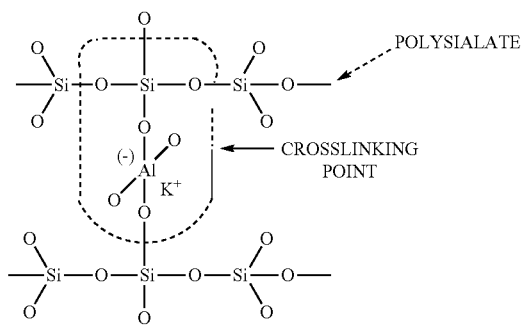

The crosslinking with polymer can be:

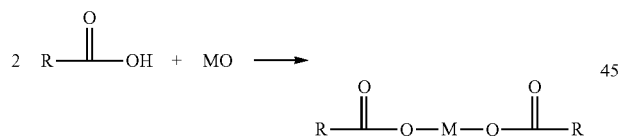

[where R is the remaining polymer such as NBR, and MO is aluminum oxide (which is generally linked to silica oxide polymer, and polymer linkages can be to aluminum oxides at separates parts of the silica oxide polymer)]

Using the formulation for Ansell standard Hyflex 11-800 nitrile supported gloves, it has been shown that abrasion resistance can be enhanced dramatically, using 2.0 phr silica, 0.5 phr WBC, or 3.0 phr silica, 0.5 phr WBC, or 4.0 phr silica, 0.5 phr WBC. Starting at less than 10000 cycles, abrasion resistance increases to, for various ratios of reagents, to about 12,000 to about 40,000 cycles. With unsupported 13 mil thickness AlphaTEC nitrile shells, abrasion resistance improved from less than 7999 cycles to between about 12,000 to about 40,000 cycles.

Without being bound by theory, it is believed that the WBC reacts with silica dispersions by the following 7-step process outlined in another context by Davidovits (cited above):

Step 1: The Al double bonded to the oxygen has the double bond broken by the OH anion. The open oxygen then strips of a hydrogen atom from the water molecule to form a second OH, and the resulting third OH group then bonds covalently to the Al atom causing the Al atom to concentrate the negative charge. The Na cation in solution then stays in ionic proximity to the Al negative grouping for charge balance.

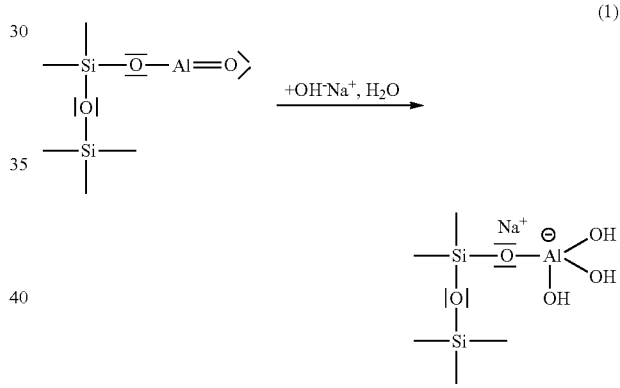

Step 2: More OH anions in solution proceed to bond to the Si forming a pentahedron with a net negative charge,

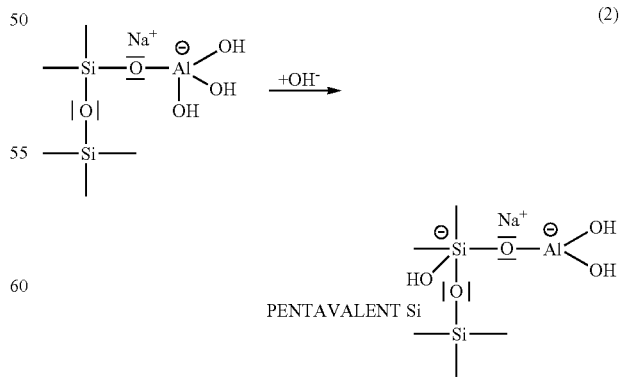

Step 3: A hydroxide shift occurs cleaving the secondary Si group from the main chain.

(3)

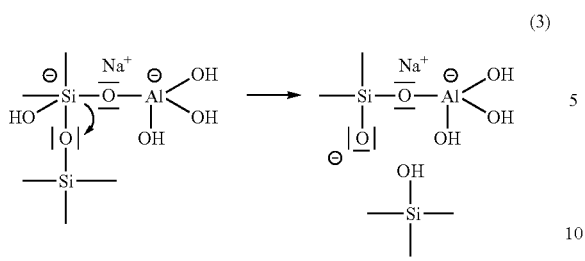

Step 4: More OH anions in solution continue to replace the bonds from Si to other constituents leaving a negatively charged oligomer, the base unit of polymerization for the geopolymer reaction. The base unit is called the ortho-siolate oligomer.

(4)

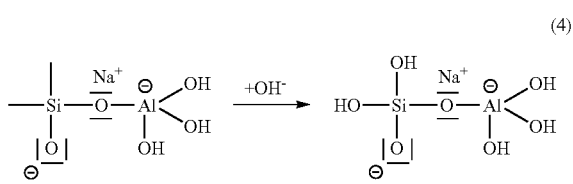

Step 5: The negatively charged siloxo grouping gains a Na cation in ionic bonding to balance charge and create the terminal bond for the polymerization.

(5)

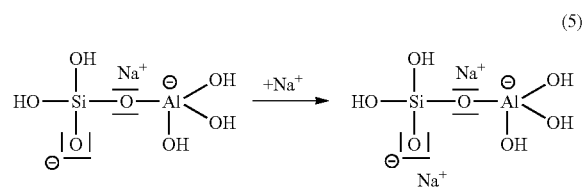

Step 6: Now the polymerization chain reactions occur as condensation reactions between the single oxygen bonded to the Si molecule reacts with OH groups attached to the Al in the oligomer. This now forms the fundamental Al—O—Si bond prevalent in geopolymers. Water molecules are liberated as a result of the polymerization reaction. In the graphic below, a cyclic polymer is formed, but chains can be formed as well. As the polymerization continues, NaOH in solution is regenerated until all the OH groups are used up in the polymerization reactions.

(6)

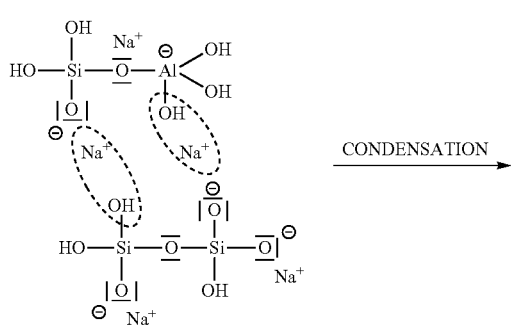

-continued

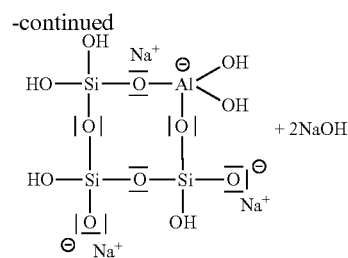

Figure 2:
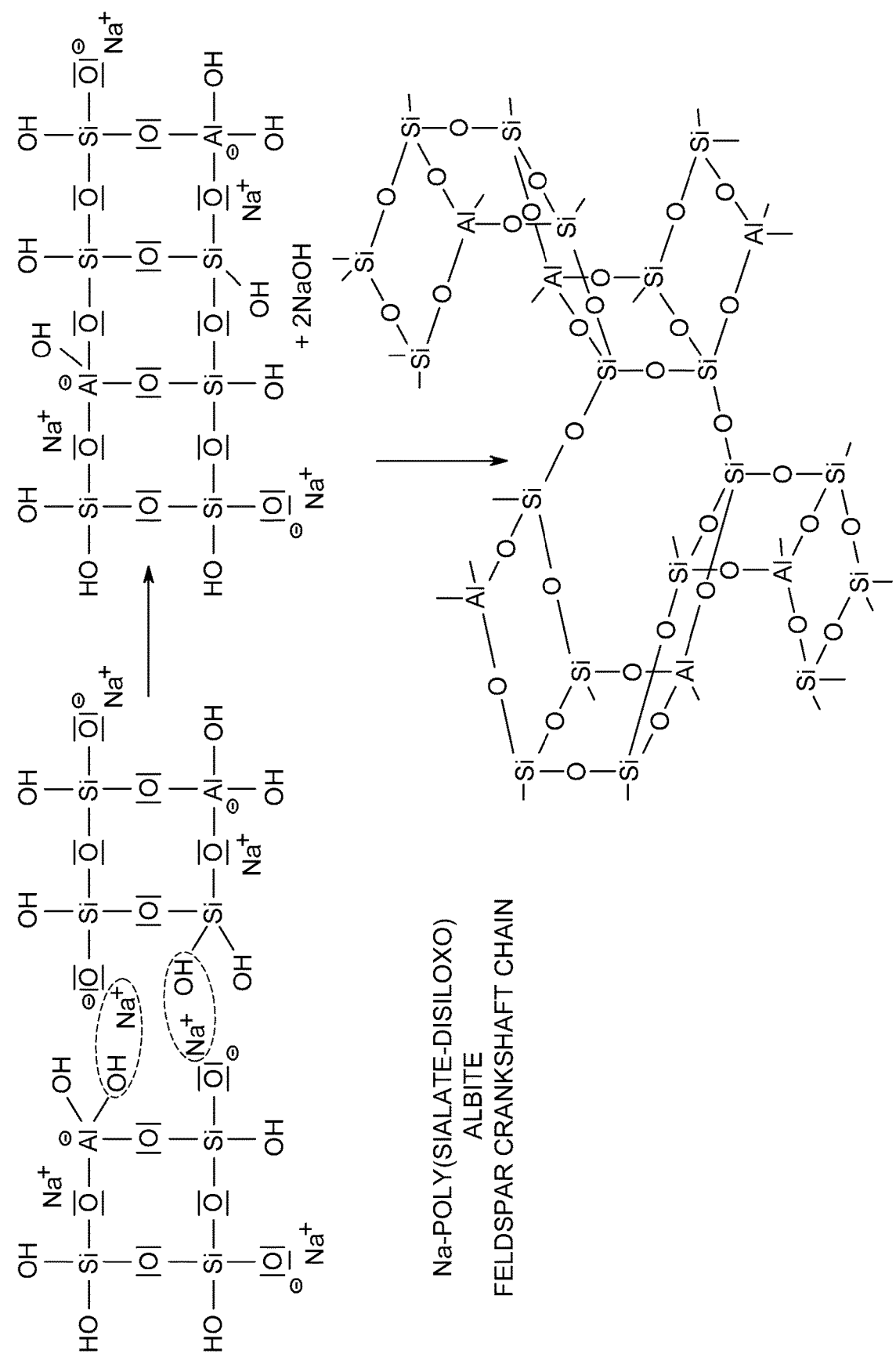
FIG. 2 illustrates proposed geopolymer growth in both linear and 3-D fashion.

Step 7: The polymerization chain reactions continue until all the OH anions are used up. The Na cations form ionic bonds with the negatively charged Al atoms in the polymer matrix. As can by seen in FIG. 2, the geopolymers can grow in both linear and 3-D fashion. It is the 3-D growth in which the liberated water molecules from condensation reactions get "trapped" in the polymer matrix.

Nanosilica dispersions from (Nanosil N4040 (20 nm) from Nanosil Asia Pacific, Dispercoll S3030 (9 nm) from Bayer, and Nexsil 20 dispersion from Nyacol Nanotechnologies, Inc. and the like can be used.

Specific embodiments according to the methods of the present invention will now be described in the following examples. The examples are illustrative only, and are not intended to limit the remainder of the disclosure in any way.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention.

A laminate is a bonding, fusing, adhesion, or the like between polymer layers, or between polymer and fabric layers, such that in the range of anticipated use the laminate is a unitary structure.

Where a sentence states that its subject is found in embodiments, or in certain embodiments, or in the like, it is applicable to any embodiment in which the subject matter can be logically applied.

Example 1

In experimental coating made to form the polymer layers of Examples 1-3, the parameters set forth in Table 1 were used:

TABLE 1

| Process Flow | Specifications |
| --- | --- |
| Preheat former | 58° C. |
| Coagulant Dip | 42-45° C. |
| Former Drip down | 130 second |
| Former Dry up | 130 second |
| Latex dipping | Ambient temperature |
| Drip down | 100 second |
| Dry up | 100 second |

TABLE 1-continued

| Process Flow | Specifications |
|---|---|
| Ambient dry | 2400-2700 second |
| Curing | 90° C., 100° C. and 130° C. @ 15 minutes each temperature |

A WBC crosslinker comprising of Aluminium oxide, sodium hydroxide and polyhydric alcohol was introduced into the mixing of nanosilica dispersion and then mixed into nitrile latex. The compound had stability issues. The compounded latex was foamed and exhibited the following parameters: pH: 9.2-9.76; Viscosity: 2200-2500 cps; Air density: 27-30% (as a percentage of total aerated volume). The silica and WBC were premixed, using 1 part per hundred rubber (PHR) silica and 0.01 PHR WBC.

Otherwise formulated to make Ansell Hyflex 11-800, abrasion resistance results were:

| | Item | |
|---|---|---|
| Sample | Standard 11-800 (cycles) | Experimental formulation (cycles) |
| #1 | 4948 | 20122 |
| #2 | 2739 | 21408 |
| #3 | 4509 | 22378 |
| #4 | 6440 | 39039 |

A six-fold increase in abrasion resistance resulted. The Hyflex 11-800 experimental formulation was augmented by the addition of 24 hours matured WBC/nanosilica composite or sodium polysiliate oligomers into a standard Hyflex 11-800 carboxylated nitrile latex formulation. The abrasion resistance increase occurred without any WBC added directly into nitrile latex (instead added to the silica composition). Accordingly, it appears that 3-D silica alumina oligomers entangled into the nitrile elastomeric matrix and enhanced its mechanical abrasion performance.

Example 2

The experiment was repeated with silica: WBC ratios as follows (in PHR):

| Item | A1 | A2 | A3 | A4 | A5 | A6 |
|---|---|---|---|---|---|---|
| Nanosilica | 1.0 | 1.0 | 1.0 | 1.0 | 1.0 | 1.0 |
| WBC | 0.01 | 0.025 | 0.05 | 0.1 | 0.5 | 1.0 |

The abrasion results were:

| | Item | | | | | |
|---|---|---|---|---|---|---|
| Sample | A1 | A2 | A3 | A4 | A5 | A6 |
| #1 | 15242 | 20122 | 7994 | 17374 | 9447 | 9995 |
| #2 | 25082 | 21408 | 11287 | 17390 | 16474 | 12646 |
| #3 | 30872 | 22378 | 14111 | 19303 | 27212 | 18274 |
| #4 | 33146 | 39039 | 14767 | 20373 | 27241 | 20876 |

Example 3

The experiment was repeated with silica: WBC ratios as follows (in PHR):

| Item | A1 | A2 | A3 | A4 | A5 |
|---|---|---|---|---|---|
| Nanosilica | 1.0 | 1.2 | 1.4 | 1.6 | 2.0 |
| WBC | 0.025 | 0.03 | 0.035 | 0.04 | 0.5 |

The abrasion results were:

| | Item | | | | |
|---|---|---|---|---|---|
| Sample | A1 | A2 | A3 | A4 | A5 |
| #1 | 11800 | 9000 | 27651 | 2804 | 2739 |
| #2 | 18617 | 10947 | 27698 | 3612 | 3343 |
| #3 | 23945 | 12900 | 26966 | 3922 | 4000 |
| #4 | 32700 | 30719 | 30200 | 5447 | 4491 |

Thus, it was determined that, under these conditions, it was preferable to maintain silica lower than 1.4 phr and WBC lower than 0.035 phr WBC Example 4

Next, the WBC additive was tried in forming thick nitrile unsupported gloves. The formulation included a mixture of carboxylated nitrile (70 phr) and vinyl acetate-ethylene (EVA)(30 phr). Nanosilica was 1.4 phr, and WBC was 0.07 phr. Process parameters included:

| Process Flow | Specifications |
|---|---|
| Preheat former | 55-60° C. |
| Coagulant temperature | 60-65° C. |
| Coagulant pre-dry | 55° C. |
| Latex dipping | No dwell |
| Leaching | 300 seconds |
| Curing | 90° C., 110° C., 130° C. @ 18 minutes |

This experiment produced those Ansell AlphaTEC nitrile-analogous shells discussed above. Abrasion resistance improved from less than 7999 cycles to between about 12,000 to about 40,000 cycles.

Example 5

Next, the WBC additive was tried in forming thin single use nitrile unsupported gloves. Various amounts of ZnO were included in the standard curing package. When added, silica was 5.0 phr and WBC was 0.25 phr. ZnO was 1.8, 1.5 or 1.2 phr. At 1.8 phr, the resultant gloves did not match the WBC-free gloves in n-hexane resistance, and were in fact poor performing. With reduced ZnO, performance was equal. This is believed to be due to zinc ions interfering with forming crosslinks at carboxylic acid functionalities.

In these experiments, dipping parameters were:

| Process Flow | Specifications |
|---|---|
| Preheat former | 45° C. |
| Coagulant temperature | 50-55° C. |
| Coagulant pre-dry | 50° C. |
| Latex dipping | Ambient temperature |
| Leaching | 180 second |
| Beading | |
| Curing | 130° C. @18 minutes |

The gloves were 4.7 mils thick, or 0.12 mm.

Example 6

Example 5 was adjusted with a reduction of total solid content in anticipation of reduction in film thickness. An amount of calculated water was added into the compound and adjusted to 20% TSC. The thickness of glove was reduced to target 4.3 mils (0.10 mm single wall) with double dip process. ZnO was 1.25 phr. Dipping parameters were:

| Process Flow | Specifications |
| --- | --- |
| Preheat former | 45° C. |
| Coagulant temperature | 50-55° C. |
| Coagulant pre-dry | 507° C. |
| 1$^{st}$ Latex dipping | No dwell |
| Coating pre-dry | 60 secs @ 100° C. oven |
| 2$^{nd}$ Latex dipping | No dwell |
| Leaching | 180 second |
| Beading | |
| Curing | 130° C. @18 minutes |

The result was gloves of thickness 3.8 to 4.0 mils (0.09-0.1 mm), and n-hexane breakthrough time of at least 480 minutes, the same as the thicker glove without WBC/silica addition.

Example 7

Next, the WBC additive was tried in forming thin (10 mil) version of the Ansell Solvex glove (usually 15 mil). When added, silica was 5.0 phr and WBC was 0.25 phr. Further added were 0.5 phr of an antisettling agent (polysaccharide gum from Kelco Inc., Atlanta, Ga.) and 0.01 phr of a nonionic detergent (Triton X100). The detergent is believed to stabilize the nanosilica dispersion and effectively wet the nano silica particles.

The resulting gloves were Level 3, very close to Level 4, for abrasion resistance. Samples were measured at 9000, 8500, 8500 and 6500, compared to, for the thicker Solvex glove, 9000, 9000, 10000, 13000.

The resulting gloves were Level 2, very close to Level 3, for sulfuric acid resistance. Samples were measured at 59, 68 and 63 minutes, compared to, for the thicker glove, 76, 64 and 90 minutes.

The resulting gloves were Level 2 for methanol resistance. Samples were measured at 35, 30 and 35 minutes, compared to, for the thicker glove, 66, 64 and 57 minutes.

Example 8

Figure 3:
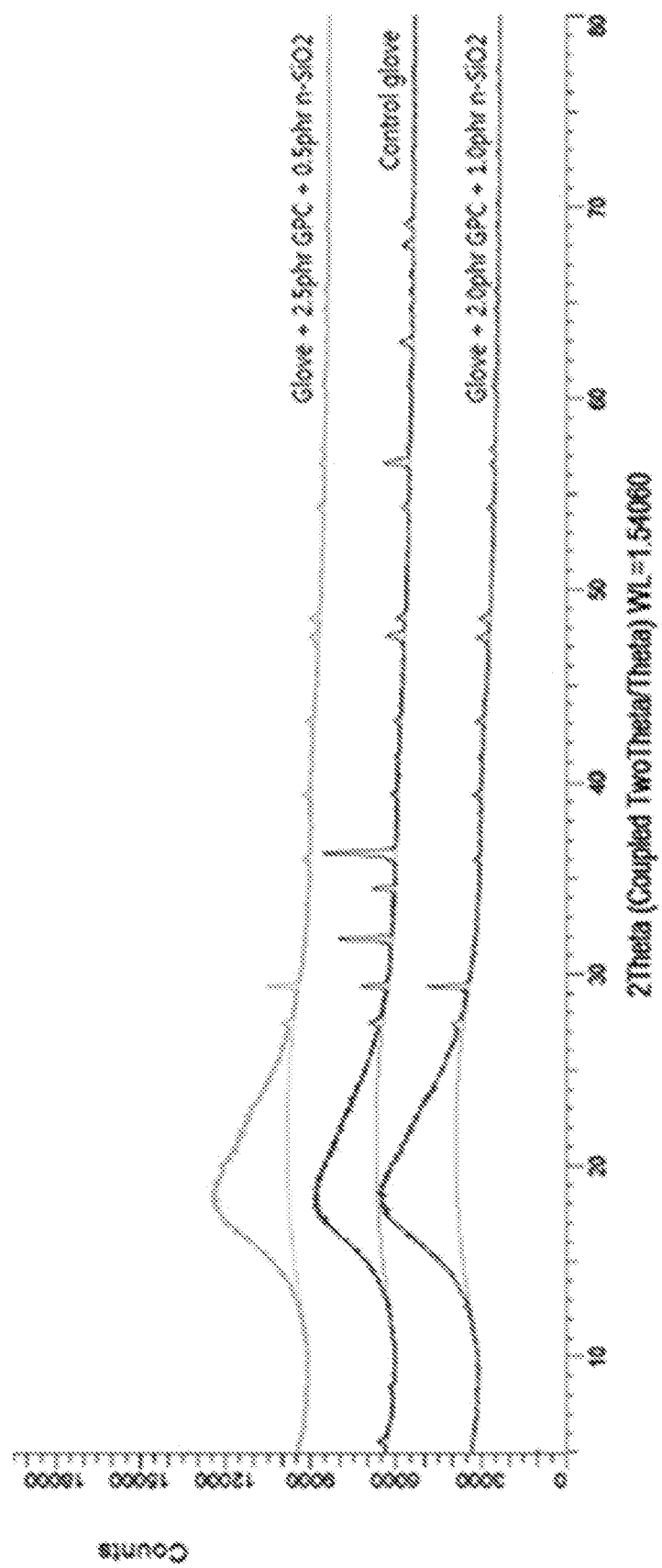
FIG. 3 shows XRD scans of gloves formed with the invention versus one formed without the invention.

It is believed that formulations with higher amounts of WBC and lower amounts of silica than exemplified above can be very effective in reducing chemical resistance. Gloves were made with 2.5 phr WBC and 0.5 phr silica (5:1 ratio), and with 2.0 phr WBC and 1.0 phr silica (2:1 ratio), and examined by X-ray diffraction analysis, as shown in FIG. 3. Notably, in the experimental data, compared to gloves without these additives, three peaks at about 2Theta 32, 35 and 36.5 are missing. Without being bound by theory, this is believed to be due to ionic crosslinking by crystalline zinc oxide (in the control) being substantially substituted with amorphous ionic crosslinking of aluminium polysiliate.

The average cyclohexanone swell indexes for the control, 2:1 ratio glove and 5:1 ratio glove were measured, and were 76.9%, 73.8% and 69.3% respectively. This indicates that the silica alumina polymer composite had tighter or additional crosslinking.

Thermogravimetric analysis of these samples shows a second distinct peak at about 560° C., indicating additional breakdown of geopolymer crosslinks by dihydroxylation apart from breakdown of covalent sulfur bonding about 460° C.:

| | $T_{max}1$, °C. | $T_{max}2$, °C. | ΔT1, % | ΔT2, % | Residue, % |
| --- | --- | --- | --- | --- | --- |
| Control | 460.52 | N/A | 85.19 | N/A | 14.81 |
| 2:1 | 453.37 | 568.97 | 52.65 | 34.34 | 13.01 |
| 5:1 | 458.90 | 560 | 67.49 | 18.8 | 13.7 |

Differential scanning calorimetry showed a shift to lower Tg indicating flexibility of the 3D bond network instead of usual shifting towards a higher Tg typically seen with filler loading.

XRF analysis showed the presence of aluminates and silicates in the silica alumina polymer composite gloves but not the control, and greater loading with aluminates in the 5:1 ratio glove vs. the 2:1.

NUMBERED EMBODIMENTS

The invention can be further described with respect to the following numbered embodiments:

Embodiment 1

An polymeric protective garment comprising a layer of carboxylated polymer that incorporates an alumina-silica composition, thus forming a silica alumina polymer composite.

Embodiment 2

A method of forming a carboxylated polymer layer of an polymeric protective garment comprising: (A) forming a silica-alumina polymer; (B) forming silica-alumina crosslinks in the carboxylated polymer; and (C) forming the polymer layer with the silica-alumina crosslinked polymer (wherein the crosslinks may form prior to, during, or after the layer formation, or a combination thereof).

Embodiment 3

A method of forming a carboxylated polymer layer of an polymeric protective garment comprising: (I) adding (a) a water-based crosslinker comprising a mixture of aluminum oxide, base and a polyhydric alcohol to (b) a water-based silica dispersion and mixing for a period of time to form a first resultant mixture; (II) adding the first resultant mixture to a composition comprising a carboxylated polymer latex; and (III) forming the polymer layer from the third mixture.

Embodiment 4

The method of forming a carboxylated polymer layer of an polymeric protective garment of Embodiment 3, further comprising: (IIa) forming the carboxylated polymer latex composition by adding to a carboxylated polymer latex a separate portion of the water-based crosslinker, and mixing for a period of time.

Embodiment 5

The polymeric protective garment of a numbered embodiment or formed thereby, wherein the layer has a breakthrough time about equal to or greater than that of a comparable layer of about 1.5 times thickness and without the composite, as measured by EN374-3 2003, wherein breakthrough time measured with respect to one or more of n-hexane, methanol, or sulfuric acid.

Embodiment 6

The polymeric protective garment of a numbered embodiment or formed thereby, wherein the layer has a breakthrough time greater than that of a comparable layer without the composite, as measured by EN374-3 2003, wherein breakthrough time measured with respect to one or more of n-hexane, methanol, or sulfuric acid.

Embodiment 7

The polymeric protective garment of a numbered embodiment or formed thereby, wherein the layer has a breakthrough time about twice or greater than that of a comparable layer without the composite, as measured by EN374-3 2003, wherein breakthrough time measured with respect to one or more of n-hexane, methanol, or sulfuric acid.

Embodiment 8

The polymeric protective garment of a numbered embodiment or formed thereby, wherein the layer has an abrasion resistance greater than that of a comparable layer without the composite, as measured by EN388:16 2016. In embodiments, the garment has a balance of improved solvent breakthrough time and improved abrasion resistance.

Embodiment 9

The polymeric protective garment of a numbered embodiment or formed thereby, wherein the layer has an abrasion resistance about twice or greater than that of a comparable layer without the composite, as measured by EN388:16 2016.

Embodiment 10

The polymeric protective garment of a numbered embodiment or formed thereby, wherein the carboxylated polymer comprises a major portion of carboxylated acrylonitrile butadiene.

Embodiment 11

The polymeric protective garment of a numbered embodiment or formed thereby, wherein the garment is unsupported.

Embodiment 12

The polymeric protective garment of a numbered embodiment or formed thereby, wherein the garment is a glove.

Embodiment 13

The polymeric protective garment of one of a numbered embodiment or formed thereby, wherein the layer of carboxylated polymer is dip-formed.

Embodiment 14

The polymeric protective garment of one of a numbered embodiment or formed thereby, wherein X-ray fluorescence (XRF) analysis of S, CA, Zn, SI, Al, Ti, P, K, Hf, Cu and Fe finds from about 0.03% by weight to about 15% Al, or 0.15% Al or more, or 10% Al or less.

Embodiment 15

The polymeric protective garment of one of a numbered embodiment or formed thereby, wherein X-ray fluorescence (XRF) analysis of S, CA, Zn, Si, Al, Ti, P, K, Hf, Cu and Fe finds from about 1% by weight to about 15% Si, or 2% Si or more, or 10% Al or less.

Embodiment 16

A polymeric protective garment formed by a numbered embodiment.

This invention described herein is of a polymer layer incorporating a silica alumina polymer composite and methods of forming the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that subfeature.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

The invention claimed is:

1. A polymeric protective garment comprising a layer of carboxylated polymer that incorporates an alumina-silica composition such that the polymer is crosslinked with an alumina-silica network, such that the layer is a silica alumina polymer composite, wherein the layer has a breakthrough time greater than that of a comparable layer without the composite silica alumina, as measured by EN374-3 2003, wherein breakthrough time measured with respect to one or more of n-hexane, methanol, or sulfuric acid.

2. The polymeric protective garment of claim 1, wherein the carboxylated polymer layer has a breakthrough time about equal to or greater than that of a comparable layer which comparable layer has about 1.5 times the thickness of the carboxylated polymer layer and lacks the composite silica alumina, as measured by EN374-3 2003, wherein breakthrough time measured with respect to one or more of n-hexane, methanol, or sulfuric acid.

3. The polymeric protective garment of claim 1, wherein the layer has a breakthrough time about twice or greater than that of a comparable layer without the composite silica alumina, as measured by EN374-3 2003, wherein breakthrough time measured with respect to one or more of n-hexane, methanol, or sulfuric acid.

4. The polymeric protective garment of claim 1, wherein the layer has an abrasion resistance greater than that of a comparable layer without the composite silica alumina, as measured by EN388:16 2016.

5. The polymeric protective garment of claim 1, wherein the layer has an abrasion resistance about twice or greater than that of a comparable layer without the composite silica alumina, as measured by EN388:16 2016.

6. The polymeric protective garment of claim 1, wherein the carboxylated polymer comprises more than 50% by weight of carboxylated acrylonitrile butadiene.

7. The polymeric protective garment of claim 1, wherein the garment is unsupported.

8. The polymeric protective garment of claim 7, wherein the garment is a glove.

9. The polymeric protective garment of claim 1, wherein the layer of carboxylated polymer is dip-formed.

10. The polymeric protective garment of claim 9, wherein the garment is unsupported.

11. The polymeric protective garment of claim 10, wherein the garment is a glove.

12. A method of forming the polymeric protective garment of claim 1 by forming the carboxylated polymer layer comprising:
  A. forming a silica-alumina carboxylated polymer;
  B. forming silica-alumina crosslinks in the carboxylated polymer; and
  C. forming the polymer layer with the silica-alumina crosslinked polymer.

13. The method of forming the polymeric protective garment of claim 12 by forming the carboxylated polymer layer comprising:
  wherein step A comprises adding (a) a water-based crosslinker comprising a mixture of aluminum oxide, base and a polyhydric alcohol to (b) a water-based silica dispersion and mixing for a period of time to form a first resultant mixture; and
  wherein steps A and B comprise:
    adding the first resultant mixture to a composition comprising a carboxylated polymer latex to form a third mixture; and
    forming the polymer layer from the third mixture.

14. The method of forming the polymeric protective garment of claim 13, further comprising:
  forming the carboxylated polymer latex composition by adding to a carboxylated polymer latex a separate portion of the water-based crosslinker, and mixing for a period of time.

15. The polymeric protective garment of claim 6, wherein the carboxylated polymer layer has a breakthrough time about equal to or greater than that of a comparable layer which comparable layer has about 1.5 times the thickness of the carboxylated polymer layer and lacks the composite silica alumina, as measured by EN374-3 2003, wherein breakthrough time measured with respect to one or more of n-hexane, methanol, or sulfuric acid.

16. The polymeric protective garment of claim 6, wherein the layer has a breakthrough time about twice or greater than that of a comparable layer without the composite silica alumina, as measured by EN374-3 2003, wherein breakthrough time measured with respect to one or more of n-hexane, methanol, or sulfuric acid.

17. The polymeric protective garment of claim 6, wherein the layer has an abrasion resistance greater than that of a comparable layer without the composite silica alumina, as measured by EN388:16 2016.

18. The polymeric protective garment of claim 6, wherein the layer has an abrasion resistance about twice or greater than that of a comparable layer without the composite silica alumina, as measured by EN388:16 2016.

19. The polymeric protective garment of claim 6, wherein the layer has a breakthrough time greater than that of a comparable layer without the composite silica alumina, as measured by EN374-3 2003, wherein breakthrough time measured separately with respect to n-hexane, methanol, and sulfuric acid.

* * * * *